United States Patent [19]

Schmidt

[11] Patent Number: 4,690,187

[45] Date of Patent: Sep. 1, 1987

[54] METHOD AND APPARATUS FOR FLAIL DEBARKING

[75] Inventor: Phillip A. Schmidt, Seattle, Wash.

[73] Assignee: Weyerhaeuser Company, Tacoma, Wash.

[21] Appl. No.: 935,595

[22] Filed: Nov. 28, 1986

Related U.S. Application Data

[63] Continuation of Ser. No. 678,437, Dec. 5, 1984, abandoned.

[51] Int. Cl.$^4$ ............................................... B27L 3/00
[52] U.S. Cl. .................................... 144/340; 144/2 Z; 144/208 J; 241/56; 241/101.7; 241/194; 241/236
[58] Field of Search .................... 241/56, 101.2, 101.7, 241/194, 236; 144/2 Z, 208 R, 208 J, 340

[56] References Cited

U.S. PATENT DOCUMENTS

| | | | |
|---|---|---|---|
| 4,131,247 | 12/1979 | Danberg | 241/56 |
| 4,214,616 | 7/1980 | Brisson | 144/208 J |

FOREIGN PATENT DOCUMENTS

| | | | |
|---|---|---|---|
| 2654161 | 11/1976 | Fed. Rep. of Germany | 144/2 Z |
| 596439 | 3/1978 | U.S.S.R. | 144/343 |

Primary Examiner—W. D. Bray

[57] ABSTRACT

Apparatus for flail debarking a plurality of logs simultaneously. The logs are fed substantially side-by-side to a flail debarking unit having sets of flailing units disposed above and below the feeding plane of the logs. A size reducing means is disposed below the feed plane of the logs for reducing the debri from the logs before it is directed to an external location.

13 Claims, 5 Drawing Figures

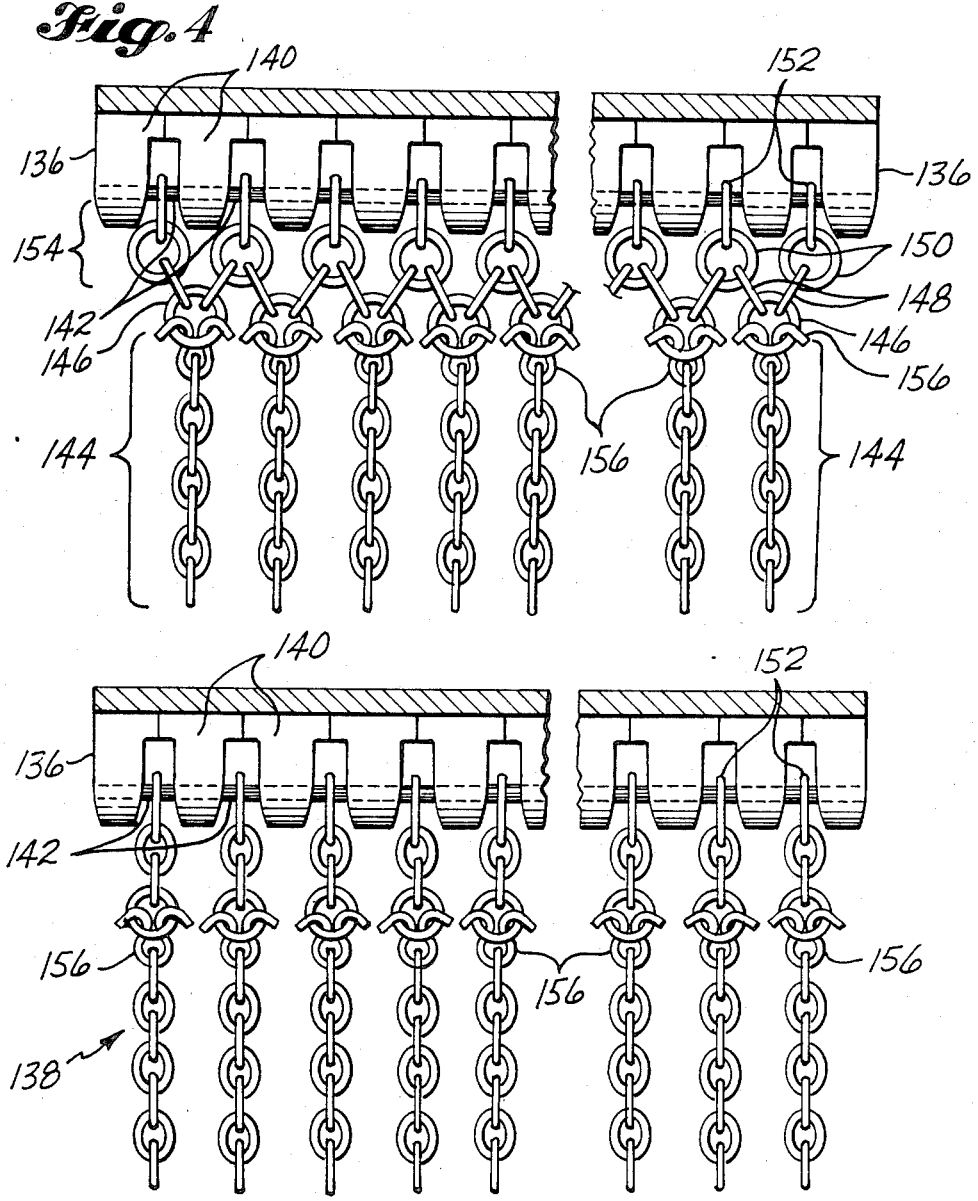

METHOD AND APPARATUS FOR FLAIL DEBARKING

This application is a continuation of application Ser. No. 678,437, filed Dec. 5, 1984, abandoned.

BACKGROUND OF THE INVENTION

The present invention relates generally to a method and apparatus for debarking tree stems and more particularly to a debarking process that utilizes the impact energy from rotating chains or the like to remove bark from the stems as they pass through the debarking station.

Typically tree stems are debarked before undergoing a subsequent conversion process whether it be to convert the tree into lumber products, veneer for plywood manufacture, or chips for pulp manufacture. In addition, when trees are cut from the forest they are typically delimbed to remove the limbs before further processing. Each of these steps preliminary to the conversion process is time consuming and expensive. The limbs and bark can be collected and used as fuel.

The prior art contains a number of different methods for both debarking and delimbing. For example, when delimbing large trees, it is common practice to employ workmen in the woods with chainsaws to simply cut the limbs in the forest before the logs are hauled to the debarking site. With large delimbed logs, debarking methods include high pressure water jets, ring type debarkers where a rotating ring with knives scrapes the bark from the tree, and other well known debarking processes.

Over the years greater quantities of smaller trees are being harvested and converted into useful products. By smaller trees, it is meant trees that are grown and harvested with smaller diameters. Most of the large old growth forests have been logged and many of the forest products companies are now harvesting subsequent growth timber.

For example, in the Midwest and southern growing regions of the United States, many forest products companies are planting, growing and harvesting trees in a cycle that utilizes extensive forest management techniques and harvesting techniques that essentially treat the trees as an agricultural crop. With this type of forest management, typically a significantly larger number of trees are harvested from the same acre of land and the harvested trees will be relatively smaller in diameter. Consequently, in order to maintain production at conversion facilities such as sawmills, plywood plants and chipping facilities, new ways must be found to handle and prepare the trees for conversion. Of course, the ways selected must be cost effecient, safe and suitable for the intended purpose.

Many ways have been disclosed for preparing large quantities of small diameter trees for conversion. For example, it has been suggested that a quantity of trees can be accumulated in bunches and then a chain flail delimbing apparatus utilized to essentially knock the limbs off the trees before they are transported to a debarking site. As with large diameter trees, chain saws may be utilized to remove the limbs, although when handling a large number of relatively small diameter trees, the cost effectiveness of utilizing chain saws goes down. After the small diameter trees are delimbed, then the debarking process must occur before subsequent conversion. Again, if relatively large diameter trees are to be converted into, for example, lumber products the tree stems will typically be debarked utilizing a ring type debarker where a single log is longitudinally passed through the debarking station. While the bark is removed, the production rate is not high in relation to the total costs. When debarking small diameter trees where the debarked trees will be converted into chips, drum type debarkers have been utilized which process a large number of tree stems in a rotating cylinder having means for mechanically removing the bark primarily by a tumbling action. This debarking method also has shortcomings in that the stems must remain in the drum for a long period to remove the bark and as a consequence good wood can be damaged.

What is needed is a method and apparatus that is capable of debarking large quantities of relatively small diameter tree length stems in a substantially continuous manner while at the same time removing the limbs and preferably converting the limbs and removed bark to fuel. Such a system should be capable of accepting a plurality of substantially full length trees with limbs in a side-by-side relationship for transport through a debarking-delimbing station. At the debarking station, substantially all limbs and bark are removed to a level where the debarked and delimbed trees can be fed directly into a chipper. The bark and limbs are fed to a conversion means where they are reduced to suitable size for use as fuel (so called "hog fuel").

Preferably this system should be capable of being, in one form, mobile so that it may be transported to a woods location where the debarking-delimbing and chip conversion can take place. In another form it may be of the stationary type typically located at a conversion facility. An integrated debarking-delimbing system and, if desired, with chipping and fuel preparation apparatus means that several handling steps are eliminated thereby reducing the overall cost of tree preparation for subsequent conversion. If the system is utilized at a woods location, the output of the system can be hauled from the woods in chip and/or fuel form, thereby significantly reducing costs compared to moving whole trees before preparation. Also with such an integrated system, the initial capital investment for meeting the general functional requirement of preparing trees for downstream conversion is significanly less.

As will become very clear to those skilled in the tree handling and conversion art, the present invention will afford significant advantages over state-of-the-art methods and apparatus. In addition, many useful specific applications of the present invention will be apparent in addition to those that are disclosed herein. It should be readily apparent that one of the primary uses of the method and apparatus will be as an economical conversion process for commercial thinnings, which are those trees removed from forests prior to a final commercial harvesting.

Accordingly a primary object of the present invention is the economical debarking of relatively small trees.

Another object of the present invention is the provision of a debarking system integrated with conversion means to reduce handling costs.

Yet a further object of this invention is to provide a high production debarking method meeting the standards for conversion to high quality chips.

Yet another object of this invention is the provision of an efficient high production debarking system that is relatively inexpensive to build and operate.

Still a further object is the provision of a debarking system that can be mobile or stationary depending upon user needs.

Yet a further object of this invention is the provision of a debarking process that also adequately delimbs at high production rates.

Still another object of this invention is the provision of close coupled means to convert the bark, limbs and foliage to usable material and the debarked, delimbed trees to chips.

Yet a further object of this invention is to provide a debarking system that is substantially enclosed to reduce the risk of potential personal injury or property damage.

Still a further object of this invention is the provision of suitable material handling means to keep the flow of material within the system smooth, uniform and consistent, thereby increasing output and reducing the occurrences of downtime due to material backups.

These and many more objects of the present invention will become apparent upon reading the specification to follow in conjunction with the attached drawings.

SUMMARY OF THE INVENTION

Briefly stated the present invention is practiced in one form by a debarking station that includes a feed path for a plurality of unbarked trees supported on conveying means. The plurality of trees oriented in side-by-side relationship will be conveyed through the debarking station with suitable constraining means acting to maintain the side-by-side relationship during debarking. A pair of flail means are positioned above and below the feed path with each having means to impact the surfaces of the trees causing the bark to be removed. The flailing means are comprised of a plurality of radially extending chain sections that impact the surface of the trees. The lengths of the chain sections vary in order to provide different oscillating characteristics to accommodate impact energy and they are thereby effective to remove bark continuously from all portions of the tree stems.

In addition to the debarking function, the chain sections will impact limbs that remain and the impact energy will shear the limbs from the trees. The bark, limbs and foliage removed by the flailing means flow downwardly from the path of travel of the trees and is caused to flow into a size reducing means where the larger material will be broken down in size to form suitably sized material such as hog fuel. At this point, the resulting converted material can be directed to a collecting station through pneumatic means or to some other location. After the side-by-side debarked, delimbed tree stems exit the debarking station, they can either be accumulated for further processing or they can be conveyed directly into a suitable chipping mechanism where they are converted into high quality chips. A suitable enclosure will surround the debarking station in order to properly retain the loose material and to direct the material flow to the proper locations.

BRIEF DESCRIPTION OF THE DRAWINGS

FIG. 4 depicts a partial row of chain sections which comprises one of the plurality of rows of chains mounted on a flail drum.

FIG. 5 is a view similar to FIG. 4 but depicts a row of chain sections having an effective longer length than those depicted in FIG. 4.

DETAILED DESCRIPTION OF THE PREFERRED EMBODIMENT

Figure 1:
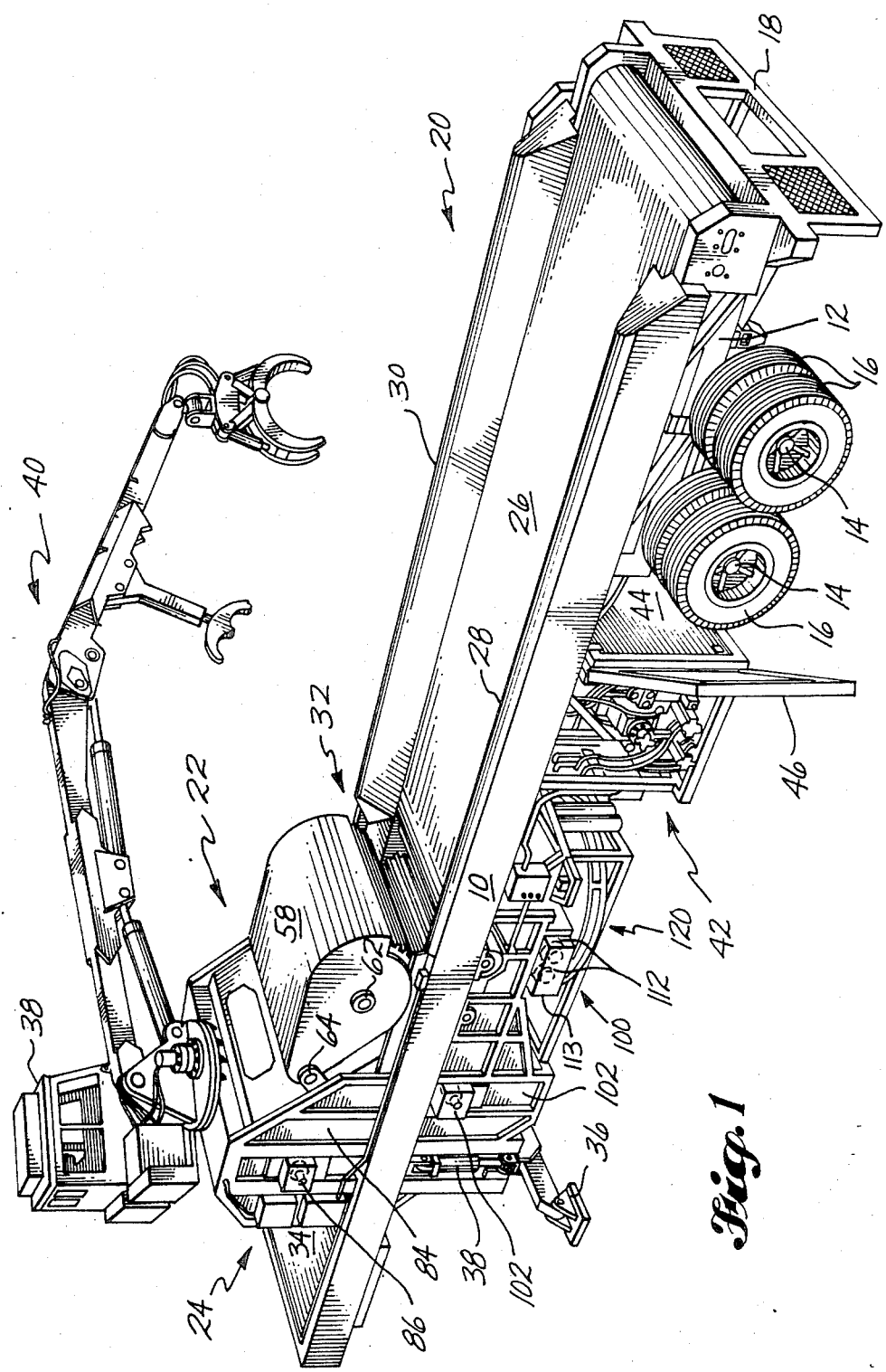
FIG. 1 is an isometric view depicting a mobile version of the debarking apparatus.

Referring first to FIG. 1, a general description will be given of the mobile version of the present invention. While a mobile version will be described, those skilled in the art will appreciate that an alternative implementation of the invention could be a stationary fixed system located within a wood handling yard. The present invention, however, does have the flexibility of being implemented in mobile form so that it can be transported to woods locations where trees can be accumulated and processed quickly and efficiently. The alternative use is where logs are accumulated in the woods and transported to a central processing area typically called a wood yard.

In the mobile version, the overall length, height and width dimensions must be sized in order to make the unit transportable over existing roads. Comprising the self-contained debarking system as depicted in FIG. 1 is a substantially flat horizontally disposed frame indicated generally at 10. Frame 10 is mounted on subframe structure 12 which in turn accommodates a pair of laterally extending side-by-side axles 14 on which wheels 16 are mounted. Wheels 16 are, of course, free to rotate and support the back end of frame 10 during transport. The back end of frame 10 also has a rear bumper structure generally indicated at 18. At the other end of frame 10, below the horizontal plane of frame 10 but connected thereto is suitable structure for supporting the front end of the system for transport. In effect, the wheel mounted horizontal frame 10 with all the rest of the elements becomes a mobile trailer, transportable to an operating site.

Horizontal frame 10 also supports the functioning elements of the debarking system including the infeed end generally indicated at 20, the debarking station generally indicated at 22 and the outfeed end generally indicated at 24. The infeed end at 20 accounts for approximately two-thirds the overall length of frame 10 and consists of an infeed conveyor belt 26 or other suitable conveying means extending longitudinally between laterally spaced side walls 28, 30. Side walls 28, 30 extend vertically above the horizontal frame 10, to a height that will be approximately equivalent to the dimension of the largest diameter tree to be processed. Side walls 28, 30 function to guide and constrain the movement of the trees to be processed after they are placed onto the conveyor belt 26. Conveyor belt 26 terminates at the infeed opening, generally indicated at 32, to the debarking station 22. The outfeed end 24 is comprised of, in the embodiment depicted, a flat support surface 34 atop which the debarked stems will travel in a downstream direction. The upper surface of the conveyor belt 26 and the upper surface of flat plate 34 form the horizontal feed plane over which the bottom most surfaces of the tree stems will travel. In order to provide a positive outfeed drive means rolls could be employed although they are not shown in the figures as could a bottom powered conveying surface.

The embodiment depicted in FIG. 1 during operation is intended to be close coupled to a commercially available mechanical chipping machine (not shown) so the stems as they are fed outwardly in the downstream direction from debarking station 22 can be fed directly into the chipping means which will pull them away from the debarking system. While a chipping station is not depicted in the figures, they are commercially available from such manufacturers as Morbark. One with ordinary skill in the tree processing arts will understand that a suitable commercially available chipping system may be close coupled to the outfeed end 24 of the debarking system and chips continuously produced as trees are fed through debarking station 22. As will be further described later, the feed rates will be matched for efficient operation.

Serving to support the horizontal frame 10 at the proper vertical height, the wheels 16 and subframe 12 will be mounted at the proper vertical location and beneath the debarking station 22 a pair of laterally spaced tubular mounted support plates each indicated at 36 serve to support the other end of the frame at its proper vertical height. Control cylinders each indicated at 38 can vary the height of horizontal frame 10 with respect to support plates 36 once they are extended outwardly and positioned in place. Functionally, support plates 36 are extendable laterally outwardly to support the overall system. The plates 36 can either be pivotally or slidably mounted within supporting frame work as will be obvious to one skilled in the art.

The length and width of conveyor belt 26 is sufficient to accommodate a plurality of full length tree stems disposed in a side-by-side relationship for transport through the debarking station 22. Usually, anywhere from two to five elongated stems will be placed on conveyor belt 26 for conveying through the debarking station in the laterally spaced orientation. This particular transport orientation for a plurality of elongated stems is known and may, for example, be seen by referring to issued U.S. Pat. No. 4,214,616 issued July 29, 1980 to M. J. Brisson and assigned to the assignee of the present invention. While the Brisson patent teaches side-by-side transport of long stems through a processing station, it is primarily intended for delimbing purposes compared to the present invention which is primarily for debarking purposes. While full length tree stems can be accommodated, shorter tree segments can also be processed.

Mounted on top of debarking station 22, which will be described in detail shortly, is an operators cab 38 and articulated boom and grapple assembly 40. The cab and boom assembly is rotatably mounted on top of the debarking station such that the operator can observe and control grapple movement. These are also commonly used in the forest products industry for picking up and handling elongated objects such as full length tree stems. Typically, the operator will have a pile of full length tree stems beside the debarking system and will manipulate the grapple and boom to pick up three or four of the stems simultaneously for placing atop the conveyor belt 26. While the present invention has been designed and is most effective in removing bark from tree stems, it is also capable of removing branches and limbs together with foliage. A handling and converting system is provided for the bark, limbs and foliage to accumulate and reduce it in size and then to clear it from the debarking station. These features will be explained later.

In the self-contained mobile debarking system, a power plant is provided indicated generally at 42 to power the various operating mechanisms. In the embodiment depicted the power plant is in an enclosure 44 which houses for example a diesel engine to provide both fluid pressure and electrical power. Given the various operating elements of the present invention, one having ordinary skill in the art will be able to provide the appropriate energy to the various drive means for the operating elements. An access door 46 is provided on the enclosure 44 to keep other unwanted items out of the power plant. The enclosure should also serve to muffle the sound generated by the power plant.

DETAILS OF DEBARKING STATION

Figure 2:
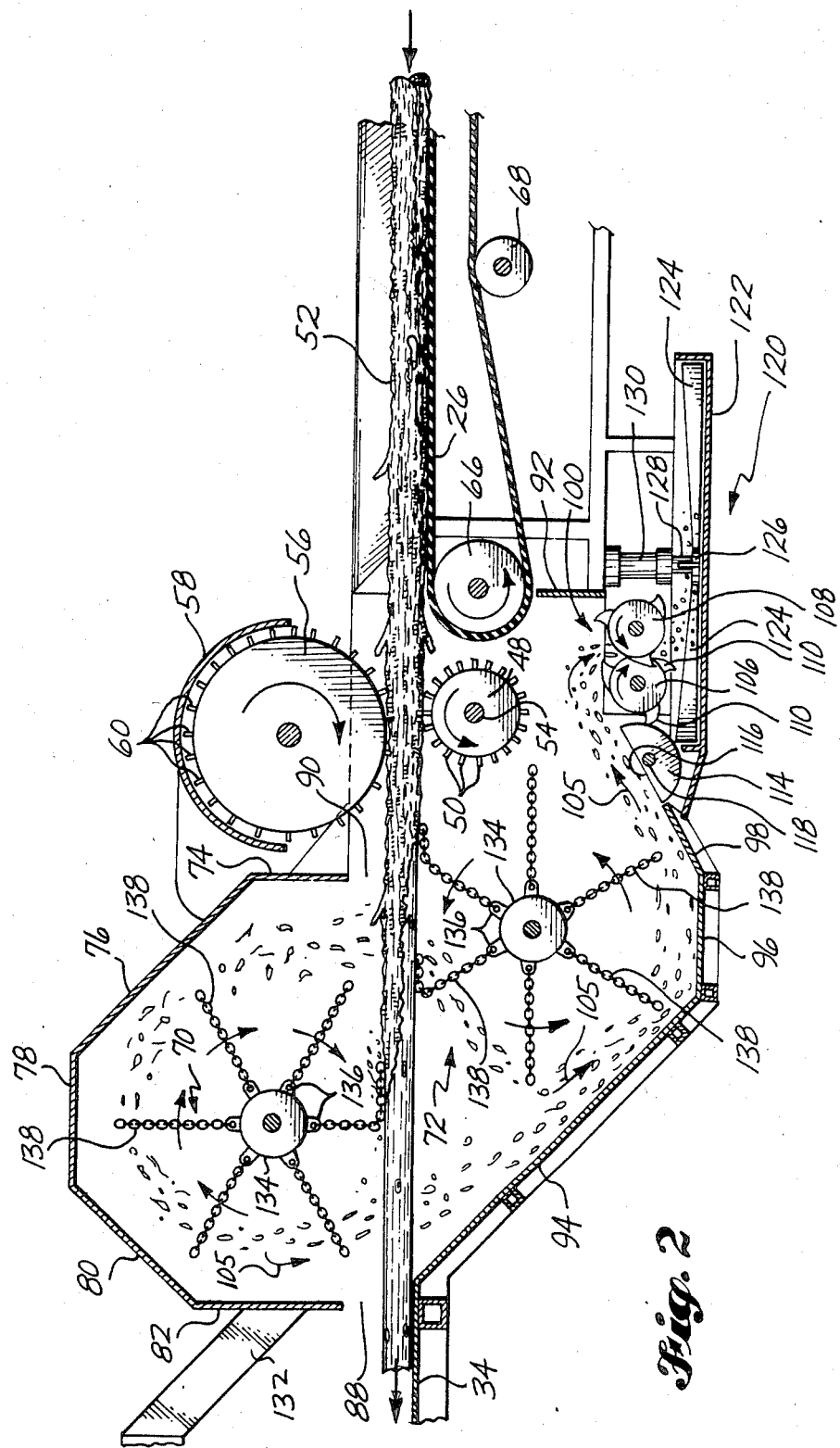
FIG. 2 is a side elevation view in cross section showing the internal design of the debarking station.
Figure 3:
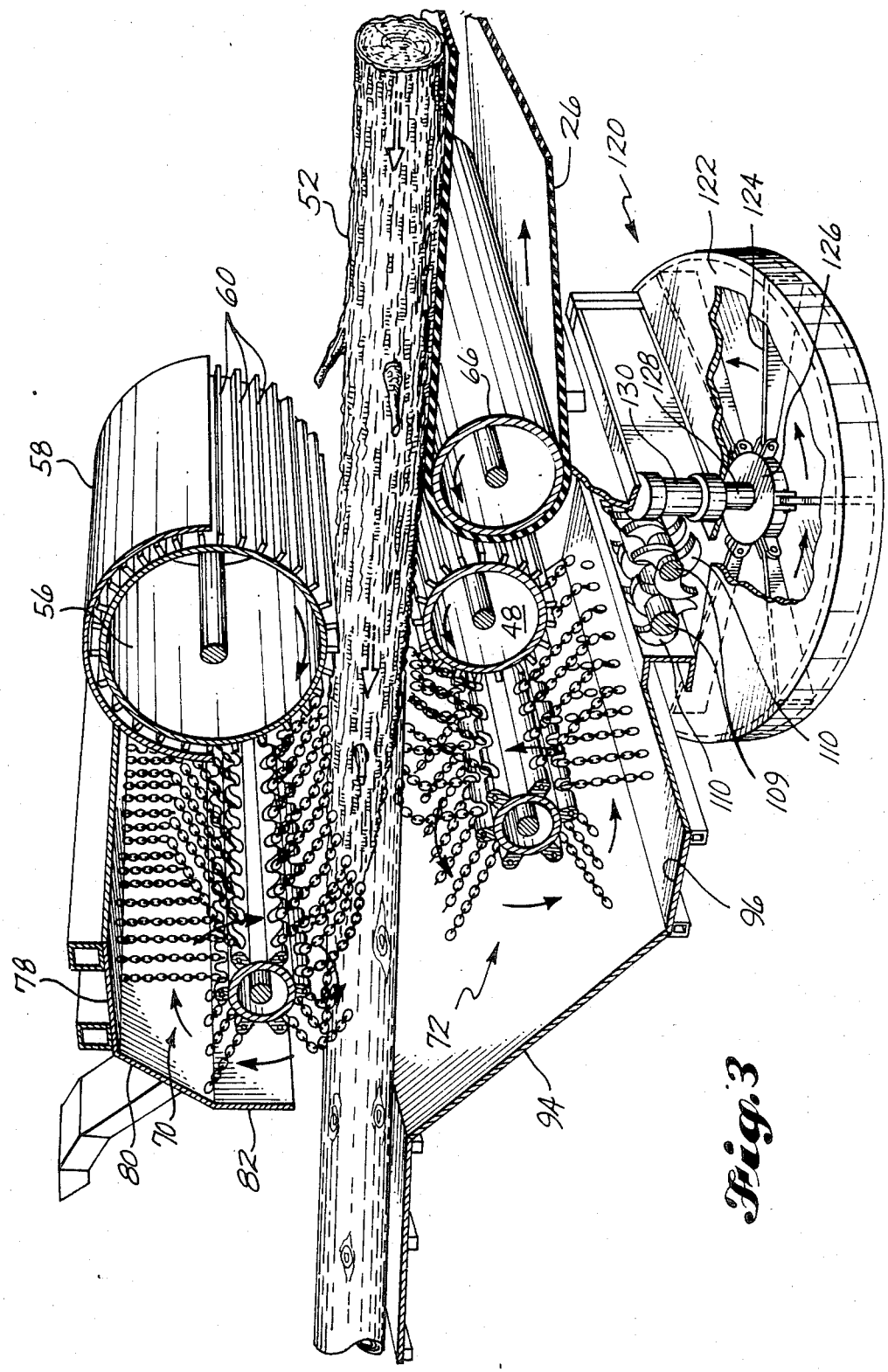
FIG. 3 is an isometric view showing the internal design of the debarking station with sections partially cut away to show the size reduction station and transport means.

At the infeed opening 32 of debarking station 22 a pair of vertically spaced feed rolls may be seen by referring to FIGS. 2 and 3. The lower feed roll 48 is fixed in position and has a plurality of peripheral teeth 50 the edges of which will, during operation, intersect the horizontal feed plane thereby contacting and pulling the elongated stems, each indicated as 52, further into the debarking station. Feed roll 48 is mounted on a suitable rotatable drive shaft 54. The top feed roll 56 is larger in diameter than roll 48 and is mounted within its supporting frame 58. Similarly to bottom roll 48 a plurality of peripheral teeth 60 are mounted on the surface of roll 56 to engage the stems. The roll 56 is rotatably mounted in laterally spaced bearings each indicated at 62 positioned within support frame 58. Support frame 58 is pivotally mounted on laterally spaced pivot points 64. Support frame 58 is also an enclosure for top roll 56 and serves to restrain flying debris.

As will be readily apparent to those skilled in the art, top roll 56 is pivotally mounted in order to accommodate various log sizes as they are transported into the debarking station in the side-by-side relationship. It has been found that approximately 3500 lbs of force is desirable to have exerted by the top roll on the top surfaces of the traveling stems. With such a force, positive feed is maintained and the stems are maintained in their side-by-side relationship and in addition some limbs will be broken early and will fall downwardly into the bottom of debarking station 22. Still referring to FIG. 2, the downstream end of conveyor belt 26 may be seen as being spaced longitudinally from bottom roll 48. Conveyor belt 26 terminates in the longitudinal direction by being trained about a guide roll 66 which can be mounted for rotation in frame 10. A small tensioning roll 68 for belt 26 is positioned longitudinally upstream from guide roll 66 and likewise may be mounted within frame 10.

Serving to enclose and support the top and bottom flail members 70, 72 respectively is a structured enclosure consisting of upper laterally extending front wall 74, an inclined upper front wall 76, a top substantially horizontal wall 78, a back inclined wall 80 and a back substantially vertical wall 82, together with laterally opposed side walls 84. The just described walls form the top enclosure which also serves to support the top roll 56 and the top flail member 70 for rotation therein. The top enclosure for debarking station 22 as previously indicated can also serve to support the cab 38 along with its boom and grapple assembly 40. Consequently, if the top enclosure must structurally support the weight of the cab and boom and grapple assembly, it will necessarily need stiffening members and they can easily be designed into the structure. Laterally spaced opposite one another and mounted in the side walls 84 are bearings 86 for supporting the upper flail member 70 in its proper vertical and lateral orientation. Preferably bearings 86 are mounted in a structure capable of accommodating the vibrational movement generated during operation and a suitable mounting structure can include, for example, rubber mounts. At the outfeed end 24 of debarking station 22 the back vertical wall 82 will terminate and provide a lateral outfeed opening 88. Similarly at infeed end 20 the front wall 74 terminates and provides a lateral opening 90 through which the log stems 52 will travel. The openings 88, 90 must be sized so that the dimensional range of log stems to be debarked will be accommodated without jam up. At the outfeed end above lateral opening 88 an outfeed roll (not shown) or other suitable hold-down means could be provided if found necessary to provide additional restraint as the debarked log stems exit the debarking station. In the embodiment depicted in FIG. 2, the simple flat plate member 34 is shown supporting stems 52 as they leave station 22.

The bottom enclosure for bottom flail member 72 is comprised, similarly to the top enclosure, of a substantially vertical front wall member 92 that extends laterally across the enclosure just below the guide roll 66. A rear inclined laterally extending wall 94 and a laterally extending bottom wall 96 together with a transition wall member 98 form the rest of the bottom enclosure. Transition wall 98 is inclined upwardly toward front wall 92 but terminates along a lateral edge that is adjacent the size reduction station, generally indicated at 100. Side walls each indicated as 102 close off the volume within the bottom enclosure of debarking station 22. As previously mentioned the flat plate 34 that extends longitudinally in the downstream direction and serves as the outfeed surface intersects the rear inclined wall 94 to substantially completely enclose the lower portion of the debarking station. The bottom flail member 72 is, similarly to top flail 70, mounted in a pair of laterally spaced bearings 104 supported within side walls 102.

The function of the size reduction station 100 is of course to accept an incoming flow of limbs, branches, foliage, and bark as generated by flail members 70, 72 and by the breakage caused by bottom roll 48 and top roll 56 and to reduce it in size and then direct it to a suitable downstream location. The flow of the material toward the size reduction station 100 is generally as depicted in FIG. 2 by flow arrows 105 and is generally downwardly over the rear inclined wall 94, the bottom wall 96, and upwardly toward the nip of a pair of laterally extending shredder cylinders 106, 108. The shredder cylinders 106, 108 are well known to those skilled in the size reduction art and are generally comprised of a plurality of spaced shredder disks 109 having teeth elements 110 mounted on their periphery. The cylinders 106, 108 rotate in the opposite direction toward each other at the nip and draw material through the counter-rotating cylinders reducing it in size as it passes through. The cylinders 106, 108 are mounted on suitable bearings each indicated as 112 in FIG. 1 with suitable drive means (such as a hydraulic motor 113) connected thereto.

The debris dislodging means indicated at 114 under normal circumstances forms a portion of the transition wall 98 leading to the size reduction station 100. Dislodging member 114 has a substantially flat upper surface 116 and is mounted on a shaft 118 so that it may be rotated about a suitable angle whereby it serves to dislodge any stagnant debris in the area. Any suitable debris dislodging means may be utilized and in fact for some operations it may not be needed at all. Positioned just below the outfeed of the shredder cylinders 106, 108 is a debris slinging means generally indicated at 120. Slinging means 120 is mounted within enclosure 122 and is comprised of a plurality of radially extending slinger arms each indicated as 124. Slinger arms 124 radiate outwardly from hub 126 which in turn is connected to a rotatable shaft 128 which is driven by a suitable motor 130. Motor 130 could, for example, be a suitably sized hydraulic motor. As the debris, reduced in size, exits the reduction station 100, the rotating slinger arms 124 will impart momentum to the debris causing it to travel radially outwardly and then at an opening within enclosure 122 the debris will pass outwardly therefrom, for example, through an upwardly extending chute 132 which is directed to a receiving receptacle (not shown). This is a very convenient system for accumulating the debris produced by the debarking station and reducing it in size for convenient transport into an awaiting receptacle such as a hog fuel bin.

DETAILS OF FLAIL MEMBER

As depicted in FIG. 2, the top and bottom flail members 70, 72 are offset longitudinally with each being enclosed within the enclosure for debarking station 22. As depicted, each flail member is comprised in part of a laterally extending rotatable drum, each indicated as 134. Mounted on the surface of a drum 134 is a plurality of attachments bars 136, each of which serves to provide in part the attachment means for removably securing a row of outwardly extending, laterally spaced chain segments each indicated at 138. The chain segments 138 can be attached to the drums by any suitable means such as the attachment bars 136 as depicted. Attachment bar 136 is comprised of a plurality of segments each indicated at 140 (see FIGS. 4 and 5) which are removably mounted on drum 134 and which have laterally extending pins 142 bridging a gap between adjacent segments 140. The chain segments then are suspended from the pins 142. In order to properly debark the traveling stems while in their side-by-side relationship, the present flail structure is utilized and has been found to provide results whereby substantially all of the bark is removed from the stems and the chips produced from the debarked stems show a bark content of less than 1%.

As depicted, each drum 134 has six rows of chain segments attached thereto and within each row there are a plurality of chain segments 138, each terminating at substantially the same radial distance when extended fully outwardly. In order to provide good coverage for the chain segments as they impact the traveling stems for debarking purposes it has been found that six rows of chain segments with approximate lateral spacing on four-inch centers is adequate. In addition, it has been found that it is preferable to laterally offset chain segments 138 in adjacent rows in order to enhance bark removal. It has been found that extremely good results are obtained when the chain segments in the upper flail member 70 are dimensioned so as to extend approximately two inches below the horizontal feed plane and when the chain segments in the lower flail 72 are dimensioned to extend upwardly above the feed plane when in the fully extended position approximately 10 inches. In view of the fact that the normal size range for stems to be debarked will be from 4–12 inches, these chain segment dimensions therefore give adequate coverage for debarking and delimbing purposes. If the size range is increased, adjustments should be made for chain length and one with ordinary skill in the art will easily be able to design the structure for producing good results.

The chain segments 138 are essentially ordinary commercially available sections of chain with certain modifications for the present invention. On at least one of the flail members at least some of the chain segments will have a lateral vibrational length that is less than the lateral vibrational length of the other chain segments. By referring to FIG. 4, it will be seen that the chain segments indicated at 144 extend downwardly from a plurality of circular links each indicated at 146. The plurality of circular links 146 in turn are interconnected through a laterally spaced row of interconnecting links each indicated at 148 to a plurality of inner circular links 150 each of which depend from a respective pin 142 and are connected thereto by links 152. In effect, the plurality of rings and links 146, 148, 150 and 152 form an interconnected chain mesh 154 from which will depend the individual short chain segments 144. In the same flail member, the next adjacent row of chain segments will be as depicted in FIG. 5 with the chain segment length in each case extending the length from its connecting pin 142 to the last link. It has been found that to provide at least some of the chain segments with operating lengths of approximately two thirds of the dimension of full length chain segments results in improved bark removal. When the individual chain segments are in operation, they will continuously rotate and impact portions of the traveling stems. Each time a chain segment impacts the solid surface of a stem it will react and have a lateral oscillatory motion imparted thereto since it is a flexible member. It in effect acts as a pendulum moving as a dynamic mass and incurs a lateral transitory complex movement. Since it is a primary goal of the present invention to provide complete debarking around the entire circumference of each log stem as they pass through the debarking station, it was found necessary to structure the motion of the chain segments in the dynamic sense. It was discovered that by effectively shortening some of the chain segments with the interconnecting chain mesh 154 that their side-to-side vibratory motion could be changed with the shorter segments thereby providing better impact coverage over the top and bottom surfaces of the log segments. The lateral vibratory frequency is different than that of longer chain segments and the shorter chain segments are designed to impact the tops and bottoms of the log segments more frequently than they will impact along the sides. The longer chain segments provide the primary impact coverage along the side portions of the traveling log stems. The principles involved in vibratory dynamic motion are well known and can be obtained in any textbook describing the principles of oscillatory motion and the dynamics of moving masses. The chain mesh section 154 as depicted in FIG. 4 is a very convenient way to provide the shortening for the chain segments, although other means could be employed such as by extending the attachment bar radially outwardly. In the embodiment depicted and for debarking trees in the diameter range of 4–12 inches, it is appropriate to have the lengths of the chain segments be approximately 20 inches from the pins to the tips of the last links. As will be described shortly, the working length of the chain segments can be approximately 13 inches.

It has been found that typical commercially available one half inch chain link with the appropriate mass (such as 8620 steel) yields excellent debarking results and that the flail drums operate most effectively at approximately 400 RPM as the stems pass through the debarking station at a feed rate of approximately two feet per second.

It has also been found that with the above-noted flail speed and feed speed not only are the tree stems completely debarked but the feed speed through the debarking station is compatable with the operating characteristics of a typical commercially available chipping machine so the debarked stems can be fed directly into the mouth of a chipping machine. The following table lists the parameters that affect debarking qualities when practicing the present invention and also listed are the effective ranges of parameters, in each case believed to be an effective range.

| Parameters that Affect Debarking Quality, Preferred Value and Value Range | | |
|---|---|---|
| | Preferred Value | Possible Effective Value Range |
| Effective flail diameter | 52 in | 52 ± 14 in |
| Chain size (section dia.) | 0.5 in | 0.60 ± 0.20 in |
| Chain type | Grade 80 | Grade 40 or better |
| Chain attachment position | | |
| Lateral offset | 1.5 in | 1.5 ± 1.0 in |
| Chain density configuration | | |
| Rows per flail drum | 6 rows | 4–9 rows |
| Lateral spacing in row | 4.2 in | 4.2 ± 1.0 in |
| Flail drum diameter | 12.5 in | 12.5 ± 6 in |
| Flail drum RPM | 400 RPM | 300–500 RPM |
| Drum axis angle to feed line | 90° | 83°–97° |
| Flail rotation direction (as viewed from side with trees traveling left to right) | | |
| Upper flail member | CCW | CCW |
| Lower flail member | CW | CW |
| Flail height (relative to horizontal feed plane) | | |
| Upper (flail tip below bottom of feed plane) | 2 in | 2.0 ± 2.0 in |
| Lower (flail tip above bottom of feed plane) | 10 in | 10.0 + 10 − 2 in |
| Tree feed speed through debarkation station | 105 ft/min | 105 ± 40 ft/min |

It is believed that the ranges given will provide effective results for users wishing to debark typical fiber quality stems to a standard of under 1.0% (bark content in chips) while minimizing damage to stem wood at the same time. A high production rate is also maintainable when utilizing these parameters.

QUICK CONNECT LINK FOR CHAIN SEGMENTS

It is well known that the working ends of chain segments in chain flail debarker/delimbers experience a significant amount of wear, particularly in the third link from the loose end. For example, the publication issued by the Canadian Forestry Engineering and Research Industrial Commission (FERIC) in 1976 it is theorized that as the chain segments impact the traveling stems, the bottom links bounce and rebound into the third link causing considerable wear in the third link. Various solutions have been attempted to overcome this problem, among them being to loop chain segments, thereby eliminating loose ends. An innovative solution which has been found to work quite well is the use of a quick connect link in each chain segment 138 located approximately one third the distance between the attachment bar and the last link of the section. Since the lower two thirds of the length of each chain section is the primary working length, that is, the length which will experience most of the impact against tree stems, it is the portion receiving most of the wear. What is used is a quick connect link in each chain section indicated at 156 in FIGS. 4 and 5. The purpose is to allow the working ends of the chain sections to be quickly disconnected and reversed, thereby evening out the wear and extending the life of each chain segment. The quick connect link 156 is a specially modified U-shaped segment of chain material. It is very clear from FIGS. 4 and 5 that the quick connect link is a formed chain link that will reliably connect a chain with small outside dimensions to a chain with large inside dimensions (dimensions relative to each chain) so that the small chain will fit through the large chain. To connect the chains, connecting link 156 is slipped through the end of the smaller chain until the bottom of the U of the connecting link rests in the turn of the chain link. The smaller chain section is then slipped through the link of the larger chain to which it will be attached. The spread end of the connecting links do not fit through the large link and the legs rest against the surface of the larger link, thereby attaching the two chains. In the embodiment depicted the smaller chain forming those links in the working end of the overall chain sections is standard oval link chain while the larger chain link is a circular type link. The length of each type of chain will be determined so that the overall length of the assembly will be the required length for good performance. The length of the smaller chain will be such that it could be reversed once and all links will be worn before replacement. Even with reversing the chain, only six links are usually particularly worn, therefore, if the chain section was any longer, the user would be throwing away some good links at the center of the section each time the chains are changed. By using the quick connect link and reversal technique with only six links in the working section the replaced chain will be completely worn when replaced. Thus, overall chain usage with the quick connect link should be about one half. Another advantage is the standardization of replacement chain links. Any variation in overall length of chain segments on the flail members can be accomplished by changing the length of the larger chain mounted on the drum.

OPERATION OF THE SYSTEM

Whether in mobile form or stationary form an operator will pick up a collection of elongated tree stems and while the system can process one stem at a time, it is designed to process a plurality of from two to six depending on the diameter range in a side-by-side relationship. The operator will pick up the collection and deposit them atop the infeed conveyor where they will be spread out through gravity into a side-by-side relationship. A conveyor will carry them into the debarking station where the flail members will operate to impact the remaining limbs knocking them from the stem and also the chain segments will impact the bark with the impact energy knocking the bark from the stem. The rotating chain sections serve to remove substantially all of the bark and remaining limbs. An enclosure is designed so that the limbs and bark can be collected and directed downwardly and then into the portion of the enclosure where a size reduction means operates to reduce the size to transportable form. As the debarked stems exit the debarking station, they can either be collected for further processing or be transported directly into the opening of a close coupled chipping machine in which they will be converted to usable chips. Additional unique features in the flail members allow for easy maintenance and longer life of those chain sections that are the working ends. In addition, a novel feature in the flail members serves to provide complete debarking around the entire circumference of each and every log stem as it passes through the debarking station.

While a detailed description has been given of an integrated debarking system including several novel features, it will occur to those skilled in the art that certain modifications and adjustments can be made to either the apparatus or the process which will still be within the scope of the inventive concept. All such changes and modifications are intended to be included within the scope of the following claims.

What is claimed is:

1. An apparatus for simultaneously debarking a plurality of logs of the type having infeed means for longitudinally conveying a plurality of logs in a side-by-side relationship along a substantially horizontal feed plane into a debarking station with flailing means and outfeed means for conveying the debarked logs away from the debarking station, comprising:

means located above and forming a part of the infeed means to help maintain the unbarked logs in their side-by-side relationship, enclosure means substantially surrounding the debarking station including an infeed and an outfeed opening for the traveling logs, at least one top and one bottom rotatable flail member, each spaced vertically from the feed plane, comprising the flailing means whereby as the logs travel through the debarking station the rotating flail members impact the logs knocking substantially all the bark thereform, means within the enclosure means for collecting and directing the removed bark toward a debris outlet within the enclosure means and located below the feed plan, and size reducing means located substantially at the debris outlet whereby collected bark is passed therethrough to be reduced in size before being directed to an external location.

2. The apparatus as in claim 1 further including means for mobilizing the debarking station.

3. The apparatus as in claim 1 in which the flailing means include chain segments laterally spaced in a plurality of rows which extend outwardly when rotated.

4. The apparatus as in claim 3 in which the lengths, lateral spacings and rows of chain segments are effective to impact substantially all areas of the traveling logs.

5. The apparatus as in claim 1 in which a slinging means is located downstream from the size reducing means to direct the size reduced bark to the external location.

6. The apparatus as in claim 1 in which means for dislodging accumulated bark is located upstream from the size reducing means.

7. A process for simultaneously debarking a plurality of logs of the type including longitudinally feeding a plurality of logs in a side-by-side relationship along a substantially horizontal feed plane into an infeed opening of a substantially enclosed debarking station having flailing means therein and after debarking conveying the debarked logs out of an outfeed opening and away from the debarking station, comprising the steps of:

exerting a force on the logs ahead of the flailing means to help maintain the unbarked logs in their side-by-side relationship, rotating at least one top and one bottom flail member so the individual flail members will impact substantially all surface area of all logs thereby knocking substantially all the bark therefrom, and collecting the removed bark within the enclosure for the flailing means and directing it to an outlet in the enclosure below the feed plane where a size reducing means is operable to reduce the bark in size before being directed to a location external to the enclosure.

8. The process as in claim 7 in which the flail members are rotated within a range of from 300–500 RPM.

9. The process as in claim 7 in which the top and bottom flail members rotate counter to one another and in a direction so the individual flail members travel with the logs.

10. The process as in claim 7 in which the feed speed of the logs through the debarking station falls within a range of 105 ft/min±40 ft/min.

11. The process as in claim 10 including the step of passing the size reduced bark through a slinging means whereby energy is imparted to the bark to direct it to the external location.

12. The process as in claim 7 including the step of directing the debarked logs directly into a chipping means.

13. The apparatus as in claim 1 in which the size reducing means is a shredder.

* * * * *